US012536698B2

(12) United States Patent
Hatipoglu et al.

(10) Patent No.: US 12,536,698 B2
(45) Date of Patent: Jan. 27, 2026

(54) INTELLIGENT PROJECTION POINT PREDICTION FOR OVERHEAD OBJECTS

(71) Applicant: Intenseye, Inc., New York, NY (US)

(72) Inventors: Poyraz Umut Hatipoglu, Istanbul (TR); Sercan Esen, New York, NY (US); Serhat Çillidag, Berlin (DE); Okan Ulusoy, Istanbul (TR); Ali Ufuk Yaman, Istanbul (TR)

(73) Assignee: Intenseye, Inc., New York, NY (US)

( * ) Notice: Subject to any disclaimer, the term of this patent is extended or adjusted under 35 U.S.C. 154(b) by 325 days.

(21) Appl. No.: 18/213,688

(22) Filed: Jun. 23, 2023

(65) Prior Publication Data

US 2024/0428446 A1    Dec. 26, 2024

(51) Int. Cl.
*G06T 7/73*    (2017.01)
*B66C 13/46*    (2006.01)
(Continued)

(52) U.S. Cl.
CPC ............... *G06T 7/74* (2017.01); *B66C 13/46* (2013.01); *B66C 15/065* (2013.01); *G06T 7/11* (2017.01);
(Continued)

(58) Field of Classification Search
CPC . B66C 13/46; B66C 15/065; B66C 2700/084; G06T 7/11; G06T 7/248;
(Continued)

(56) References Cited

U.S. PATENT DOCUMENTS 10,482,607 B1 * 11/2019 Walters ............ H04N 21/23412
10,528,812 B1 *  1/2020 Brouard ............... G06V 20/176
(Continued)

FOREIGN PATENT DOCUMENTS

CN    111461079 A  *  7/2020  ............ G06V 20/64
CN    113128346 A      7/2021
CN    113656628 A     11/2021

OTHER PUBLICATIONS

Chian et al. "Dynamic identification of crane load fall zone: A computer vision approach." Safety science 156 (2022): 105904. (Year: 2022).*

(Continued)

*Primary Examiner* — Katrina R Fujita
(74) *Attorney, Agent, or Firm* — Cognition IP, P.C.; Edward Steakley

(57) ABSTRACT

Methods and systems provide for the intelligent prediction of projection points of overhead objects in a workplace or similar environment. In one embodiment, the system receives one or more two-dimensional (hereinafter "2D") training images of unique overhead objects within an environment; processes the 2D training images to determine training positions and projection points of each overhead object; trains one or more artificial intelligence (hereinafter "AI") models to predict 2D positions of projection points of the overhead object; receives one or more 2D inference images of the overhead objects; processes the 2D inference images to determine one or more inferred positions of the overhead objects; predicts, via the trained AI models, 2D inferred positions of the projection points of the overhead objects; and provides them to one or more client devices. In some embodiments, the system alerts a person based on their proximity to the projection point of an overhead object.

30 Claims, 12 Drawing Sheets

(51) Int. Cl.
  *B66C 15/06* (2006.01)
  *G06T 7/11* (2017.01)
  *G06T 7/246* (2017.01)
  *G06T 7/55* (2017.01)
(52) U.S. Cl.
  CPC .............. *G06T 7/248* (2017.01); *G06T 7/55* (2017.01); *B66C 2700/084* (2013.01); *G06T 2207/20068* (2013.01); *G06T 2207/20081* (2013.01)
(58) Field of Classification Search
  CPC .... G06T 7/55; G06T 7/70; G06T 7/74; G06T 2207/20068; G06T 2207/20081; G06T 2207/20084
  See application file for complete search history.

(56) References Cited

U.S. PATENT DOCUMENTS

| | | | | |
|---|---|---|---|---|
| 11,003,956 | B2* | 5/2021 | Weinzaepfel | G06V 10/82 |
| 2012/0288189 | A1* | 11/2012 | Hu | G06V 10/462 |
| | | | | 382/164 |
| 2020/0140239 | A1 | 5/2020 | Schoonmaker et al. | |
| 2020/0302168 | A1* | 9/2020 | Vo | G06N 3/045 |
| 2021/0027598 | A1 | 1/2021 | Tran et al. | |
| 2021/0049780 | A1* | 2/2021 | Westmacot | G01C 21/30 |
| 2021/0407125 | A1* | 12/2021 | Mahendran | G06V 20/20 |
| 2022/0324679 | A1* | 10/2022 | Benzing | B66C 13/46 |
| 2023/0061389 | A1 | 3/2023 | Bartek et al. | |
| 2023/0153962 | A1* | 5/2023 | Tang | G06T 7/11 |
| | | | | 382/103 |
| 2023/0196188 | A1* | 6/2023 | Horowitz | G06N 20/00 |
| | | | | 209/577 |
| 2023/0326183 | A1* | 10/2023 | Kah | G06V 10/7715 |
| | | | | 382/159 |
| 2023/0368414 | A1* | 11/2023 | Afrooze | G06N 3/08 |
| 2024/0281954 | A1* | 8/2024 | Osman | G06T 7/0004 |
| 2024/0290027 | A1* | 8/2024 | Bu | G06T 7/0002 |
| 2024/0428454 | A1* | 12/2024 | Benkert | G06T 3/06 |

OTHER PUBLICATIONS

Ren et al. "Faster R-CNN: Towards real-time object detection with region proposal networks." IEEE transactions on pattern analysis and machine intelligence 39.6 (2016): 1137-1149. (Year: 2016).*

Yang et al. "Safety distance identification for crane drivers based on mask R-CNN." Sensors 19.12 (2019): 2789. (Year: 2019).*

Jeelani et al. "Real-time vision-based worker localization & hazard detection for construction." Automation in Construction 121 (2021): 103448. (Year: 2021).*

International Search Report and Written Opinion of the International Search Authority in international application No. PCT/US2024/035271, mailed on Sep. 23, 2024.

Pateraki et al. Crane Spreader Pose Estimation from a Single View. InVISIGRAPP (5: VISAPP) Jan. 2023 (pp. 796-805). https://www.researchgate.net/publication/367051971_Crane_Spreader_Pose_Estimation_from_a_Single_View.

Aaltonen. Evaluation of a computer vision model for a crane's target position measurement system (Master's thesis). published Apr. 2021.

* cited by examiner

INTELLIGENT PROJECTION POINT PREDICTION FOR OVERHEAD OBJECTS

FIELD OF INVENTION

Various embodiments relate generally to workplace safety, and more particularly, to systems and methods for predicting the projection points of overheard objects in environments necessitating workplace safety.

SUMMARY

The appended claims may serve as a summary of this application.

BRIEF DESCRIPTION OF THE DRAWINGS

The present invention relates generally to digital communication, and more particularly, to systems and methods providing for predicting the projection points of overhead objects.

The present disclosure will become better understood from the detailed description and the drawings, wherein.

DETAILED DESCRIPTION

Figure 1A:
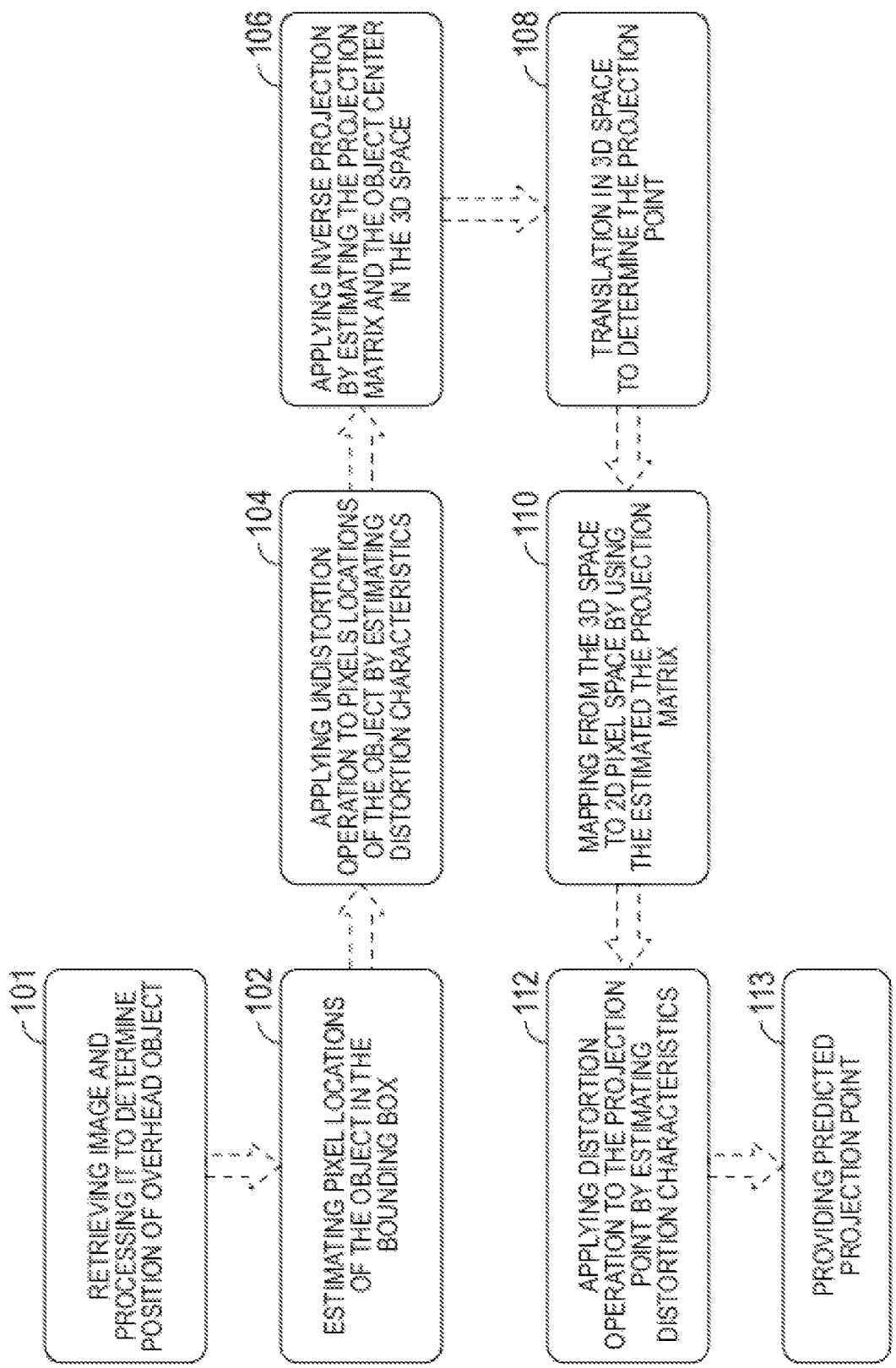
FIG. 1A is a flow chart illustrating a traditional, prior art method for determining projection points of overhead objects.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Overhead objects, such as cranes, represent crucial equipment used extensively across various industrial sectors for executing vertical and horizontal lifting operations. Despite their widespread utilization, many crane-involved incidents resulting in serious injuries and fatalities have been documented due to the intricate nature of such lifting operations. For example, from 2011 to 2017, the Census of Fatal Occupational Injuries ("CFOI") reported a total of 297 crane-involved deaths. Struck by a falling object or equipment caused 154 deaths, with 79 of them involving an object falling from or put in motion by a crane. Moreover, aside from fatal and nonfatal injuries, crane-involved accidents also cause enormous costs and loss of productivity. This includes billions in wage and productivity losses, as well as millions of workdays lost due to work-related injuries.

To enhance the occupational safety and well-being of workers, as well as prevent any accident, operators controlling overhead objects like cranes must exhibit a heightened awareness of the proximity of the object to other objects and individuals in the workplace. However, this presents a challenge as operators may occasionally carry out lifting operations without having a full view of the situation. A signal person can give instructions to the operator via either hand signals or electronic communication methods, such as radio, to increase workplace safety, but this operation is also prone to some failures because of its manual nature. There is a need to automatically predict the projection location of overhead objects from cameras or sensors and warn the workers in case of unsafe situations.

However, it's challenging to create such a warning system using cameras for two main reasons. First, the coordinates of the overhead object and the worker need to be predicted in the two-dimensional (hereinafter "2D") image plane. Second, the projection relation needs to be established to convert the representation of the worker and overhead object from the 2D image plane to the three-dimensional (hereinafter "3D") world coordinate space. The first challenge may be overcome using detection techniques such as, e.g., amodal object detection and amodal instance segmentation. The second challenge of mapping the worker and the overhead object to the 3D world coordinate space, however, has not been an active area of work for the computer vision and deep learning community. A traditional, prior art approach involves several steps, such as, e.g., calculating the camera projection relation between the 3D objects and 2D points via classical computer vision methods, estimating the depth of the intended objects, and calculating the 3D object coordinates. However, conducting this approach is not always feasible since obtaining all the required information, such as camera rotation, distortion parameters, and the size of the overhead objects, may not always be possible. There has previously not been a fully successful approach improving on this, such as one based on a neural network solution to predict the 3D world coordinates from 2D image coordinates. One previous approach involving bird's eye view cameras required at least one camera per overheard object, creating additional installation and maintenance costs, and still involved collecting images from a camera mounted on an overheard object, which results in images which are subject to vibration and contain blurred imagery, which lowers accuracy. Point cloud-based methods have also been attempted, but these methods fail to achieve adequate performance on high-resolution data in real time because they require more computational resources. Further, they employ 3D sensors which create additional expenses over an approach involving 2D cameras. Radio-frequency (RF) signals have also been used for predicting the position of people and overhead objects. However, they are generally affected by radio-frequency interference, which decreases the signal-to-noise ratio. This, in turn, can cause information loss or complete data loss in some extreme cases. Compared to cameras, these solutions have a higher installation and maintenance cost.

Thus, there is a need in the field of workplace safety to create a new and useful system and method for predicting 3D projection points of overhead objects in workplace and similar environments from 2D image coordinates. The source of the problem, as discovered by the inventors, is a lack of a deep learning model to accurately predict the projection point of an overhead object onto the ground, and the lack of ability to create a projection relation to map pixels from the 2D image plane to the 3D world coordinate space, inferring the latent relationships between the 2D image plane and the 3D scene space. Such a model can replace several challenging processing steps needed to make the same prediction using traditional computer vision approaches.

In one embodiment, the system receives one or more two-dimensional (hereinafter "2D") training images of one or more unique overhead objects within an environment; processes the 2D training images to determine one or more training positions of each overhead object and one or more training positions of projection points of each overhead object; based on at least the training positions of the overhead objects, trains one or more artificial intelligence (AI) models to predict 2D positions of projection points of the overhead object; receives one or more 2D inference images of the overhead objects captured by one or more cameras within the environment; processes the 2D inference images to determine one or more inferred positions of the overhead objects; predict, via the one or more trained AI models and using the inferred positions of the overhead objects as input, 2D inferred positions of the projection points of the overhead objects; and provides, to one or more client devices, the predicted 2D inferred positions of the projection points of the overhead objects.

In some embodiments, the system further detects the presence of at least one person within a specified proximity of the predicted projection points of the center of the object; and in response to the detection, provides an alert to the at least one person warning of danger.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a flow chart illustrating a traditional, prior art method for determining projection points of overhead objects. The flow chart illustrates a flow of processing steps to estimate the projection point of an overhead object. The dashed line flow of arrows demonstrates a traditional computer vision approach.

At a first step 101 of the traditional approach, the system retrieves an image and processes it to determine a position of an overhead object. A bounding box is placed around the object based on this determined position. At step 102, the system estimates pixel locations of the object in the bounding box. At step 104 of the traditional approach, the system applies an undistortion operation to pixel locations of the object by estimating distortion characteristics. This is due to the camera visuals most likely including a variety of visual distortions due to the nature of the camera lens. Such distortions may include, e.g., barrel effects such as a "fish-eye" lens effect. In some traditional scenarios, one common type of distortion may be radial distortions, and these are modeled in different estimation formulas.

At step 106 of the traditional approach, the system applies an inverse projection by estimating the projection matrix and the object center in the 3D space. Since the system has not yet ascertained the depth, an inverse projection operation can lead to producing erroneous projection results in 3D space. At step 108 of the traditional approach, the system performs translation in 3D space to determine the projection point, by estimating the height of the object with respect to the ground level. At step 110 of the traditional approach, the system maps from the 3D space to 2D space by using the estimated projection matrix.

At step 112 of the traditional approach, the system applies a distortion operation to the projection point by estimating the distortion characteristics. The system can then mark the projection point pixels in the image or frame. Finally, at step 113 of the traditional approach, the system provides the predicted projection point to one or more client devices.

Figure 1B:
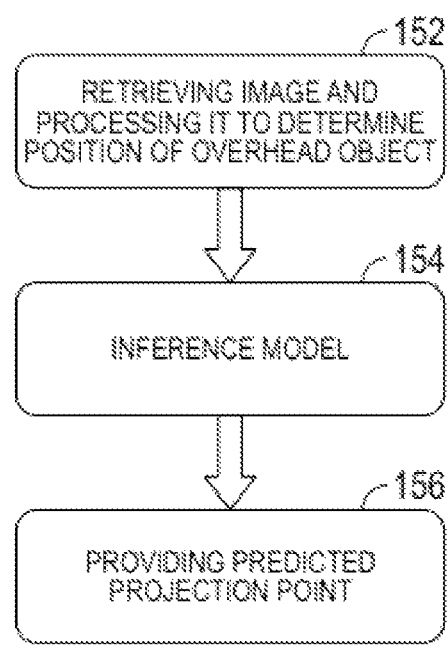
FIG. 1B is a flow chart illustrating a present method for determining projection points of overhead objects, in accordance with some embodiments herein.

FIG. 1B is a flow chart illustrating a present method for determining projection points of overhead objects, in accordance with some embodiments herein. In comparison to the traditional approach, some exemplary embodiments of the present invention reduce the number of steps significantly by employing an AI model based approach. In some embodiments, a neural network model is used to predict the 3D world coordinates of pixels. In some embodiments, the neural network model is a convolutional neural network model. In some embodiments, unlike some prior art where the model requires Red, Green, Blue plus Depth data ("RGB-D") images, the present invention approach works within the Red, Green, Blue ("RGB") domain. In addition, unlike some other neural network approaches, this model does not require correspondence between 2D image coordinates and 3D world coordinates.

First, at step 152, the system retrieves an image and processes it to determine a position of an overhead object. Then, at step 154, a trained inference model is used to predict the position of a projection point of the overhead object. In some embodiments, during the training the system can use an overhead object detection model to detect intended overhead objects in the image. An overhead object detection model may be applicable for use with, for example, the detection of an overhead crane's position within an environment. In some alternative embodiments, the system can use manually addressed overhead object(s) to train a model for predicting pixel locations of projection points. In addition to the position of the overhead objects, the system feeds the projection points to the projection model during the training. In some embodiments, this operation can be handled by addressing the projection point manually.

Finally, at step 156, the system provides the predicted projection point to one or more client devices.

Figure 2:
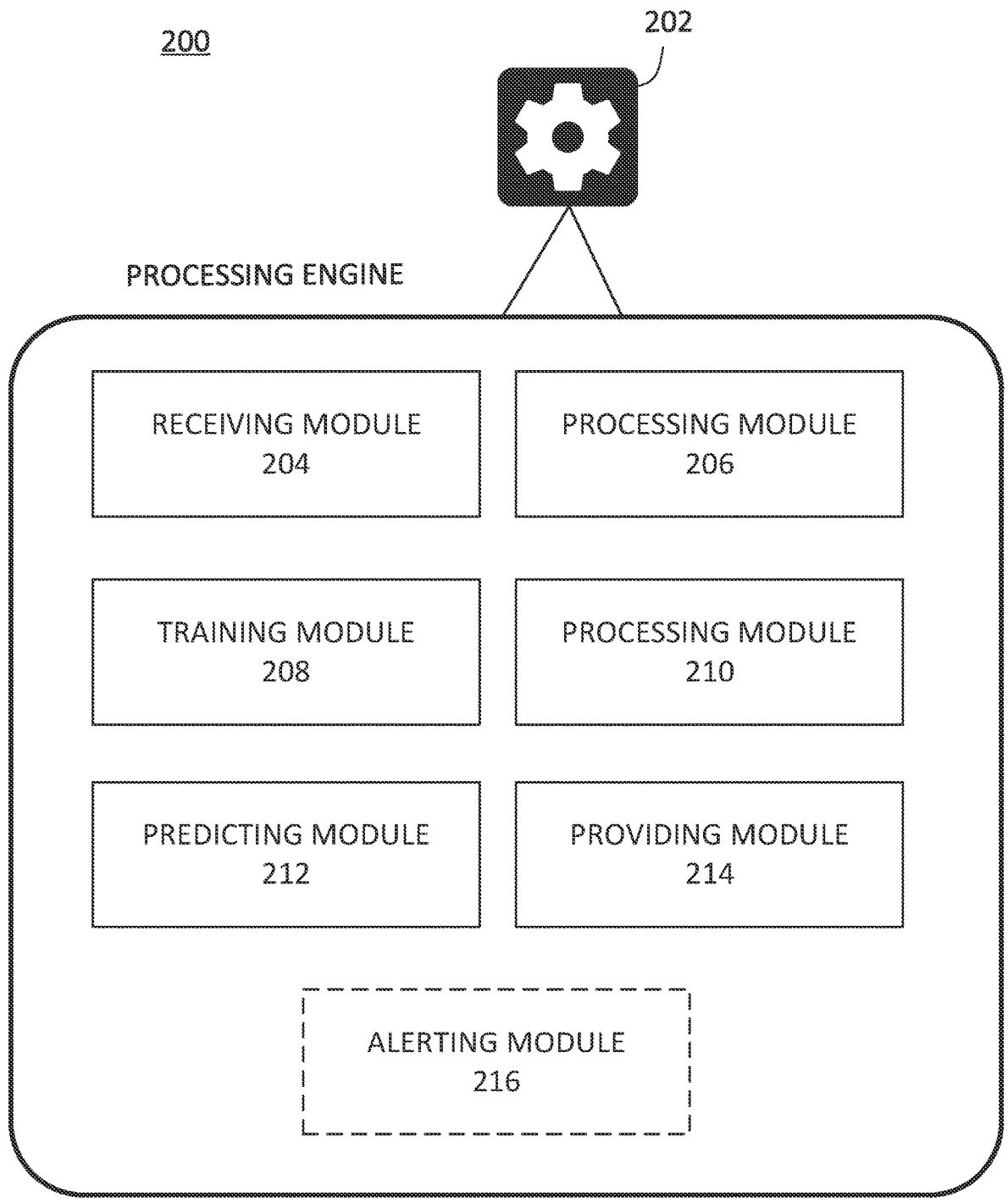
FIG. 2 is a diagram illustrating an exemplary computer system that may execute instructions to perform some of the methods herein.

FIG. 2 is a diagram illustrating an exemplary computer system that may execute instructions to perform some of the methods herein. An exemplary computer system 200 is shown with software modules that may execute some of the functionality described herein. In some embodiments, the modules illustrated are components of the processing engine 202.

Receiving module 204 functions to receive one or more 2D training images of one or more unique overhead objects within an environment. Receiving module 204 also, in a later process, functions to receive one or more 2D inference images of the overhead objects captured by one or more cameras within the environment.

Processing module 206 functions to process the 2D training images to determine one or more training positions of each overhead object and one or more training positions of projection points of each overhead object.

Training module 208 functions to, based on at least the training positions of the overhead objects, train one or more AI models to predict 2D positions of projection points of the overhead object. In some embodiments, the training module 208 receives annotations, including the positions of the overhead objects and projection points. In some embodiments, these positions might be normalized and/or transformed positional data. In some embodiments, the system may obtain the positions of the overhead objects using object detection. In some alternative embodiments, the system obtains the positions of the overhead objects using manual annotation after defining the projection points via one or more manual operations.

Processing module 210 functions to process the 2D inference images to determine one or more inferred positions of the overhead objects.

Prediction module 212 functions to predict, via the one or more trained AI models and using the inferred positions of the overhead objects as input, 2D inferred positions of the projection points of the overhead objects.

Providing module 214 functions to provide, to one or more client devices, the predicted 2D inferred positions of the projection points of the overhead objects.

In some embodiments, alerting module 216 functions to provide a proximity based alert to at least one of the people in the environment warning of dangerous proximity to at least one of the overhead objects. In some embodiments, the alert is generated depending on the position of the person and their proximity to the projection point of the overhead object.

Such functions will be described in further detail below.

Figure 3:
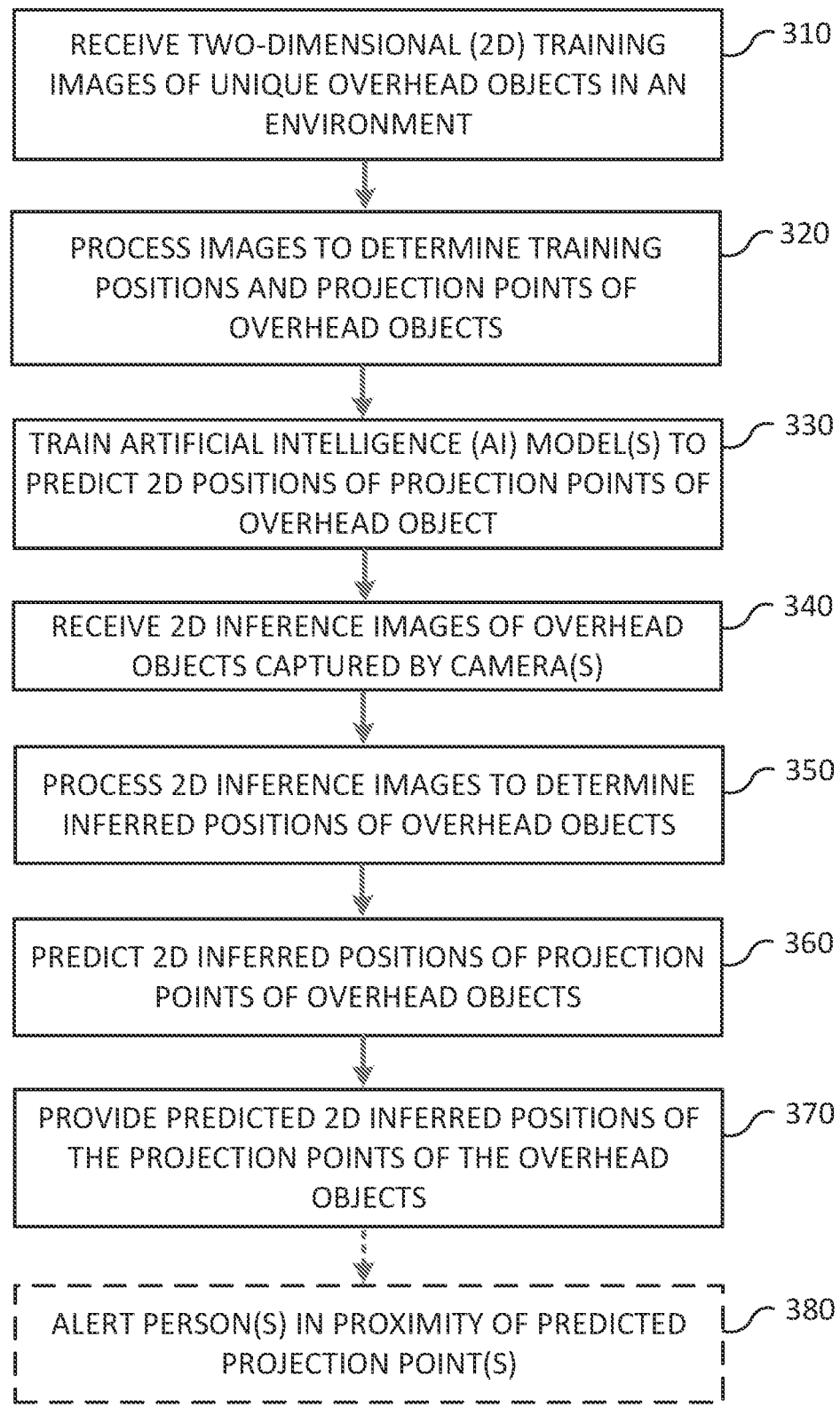
FIG. 3 is a flow chart illustrating an exemplary method that may be performed in some embodiments.

FIG. 3 is a flow chart illustrating an exemplary method that may be performed in some embodiments.

At step 310, the system receives one or more 2D training images of one or more unique overhead objects within an environment. In some embodiments, 2D training images may be visual representations captured in a two-dimensional format, such as, e.g., digital images, that depict the overhead objects from a top-down perspective. These images constitute training data for training the system's AI models, as will be described in further detail below. In some embodiments, overhead objects may be objects situated above ground level within the environment, such as, e.g., load-bearing cranes or other suitable objects situated above ground level. Each of the overhead objects is unique and distinct from one another within the training images. In some embodiments, the difference or separate elements between the unique overhead objects is labeled (e.g., via manual labeling) within the training images. In some embodiments, the received 2D training images serve as a dataset for training the AI models to recognize and understand the visual characteristics and patterns associated with these overhead objects.

In some embodiments, the 2D training images are captured by one or more cameras within the environment that visualize the overhead objects. The term "cameras" as used herein refers to any device capable of capturing visual information in the form of digital images. These cameras may include smartphones, wearable devices, or other mobile devices with built-in imaging functionality, digital cameras, video cameras, or any other suitable imaging devices. In some embodiments, the cameras are positioned strategically for model training purposes to capture clear and comprehensive views of the overhead objects from different angles and perspectives.

In certain embodiments, one or more of the overhead objects may be load-bearing cranes. Such cranes may be situated within an environment that functions as, e.g., a construction site, manufacturing facility, or other industrial environment, and functions to lift and transport heavy loads. In some embodiments, the load-bearing cranes may have specific visual characteristics, such as, e.g., booms, jibs, and counterweights, which may be captured in the 2D training images. In some embodiments, the training images are intended and configured to provide visual information to AI models, enabling them to learn the distinct visual cues associated with load-bearing cranes or other suitable overhead objects as well as their projection points.

In some embodiments, at least one of the cameras used for capturing the training images is a fixed point camera. In some embodiments, a fixed point camera is positioned in a stationary location within the environment, providing a consistent perspective of the overhead objects. In some embodiments, each of the one or more cameras may be configured to operate at any height and at any angle, as long as the overhead object is within view of the camera. This flexibility allows the cameras to capture the overhead objects from various vantage points, facilitating a comprehensive understanding of their visual characteristics for training purposes.

At step 320, the system processes the 2D training images to determine one or more training positions of each overhead object and one or more training positions of projection points of each overhead object. In some embodiments, the system uses manual annotations of the 2D training images as input to determine the training positions of the overhead objects and the training positions of the projection points of the overhead objects. In such cases, manual annotations are included in the training images to indicate the training positions of each overhead object and/or the training positions of the projection points of each overhead object.

In some embodiments, if the system is able to ascertain the exact coordinates of these training positions without the need for manual annotations or obtaining the output from a marking or annotation tool, then one or more other methods may be used to determine these training positions.

In some embodiments, amodal object detection and/or instance segmentation model is used to determine the training positions of each overhead object and of the projection points of each overhead object, with the 2D training images being entered as input into the amodal detection and/or instance segmentation model.

At step 330, based on at least the training positions of the overhead objects, the system trains one or more AI models to predict 2D positions of projection points of the overhead object. In some embodiments, rather than using the 2D training images explicitly as input, the system instead uses the training positions of the overhead objects as determined above in step 320 as input. In some embodiments, the end result of the AI training process is to output one or more AI models. A flow diagram of the training flow for steps 320 and 330 is illustrated in FIG. 4A, which will be further described below.

Figure 4A:
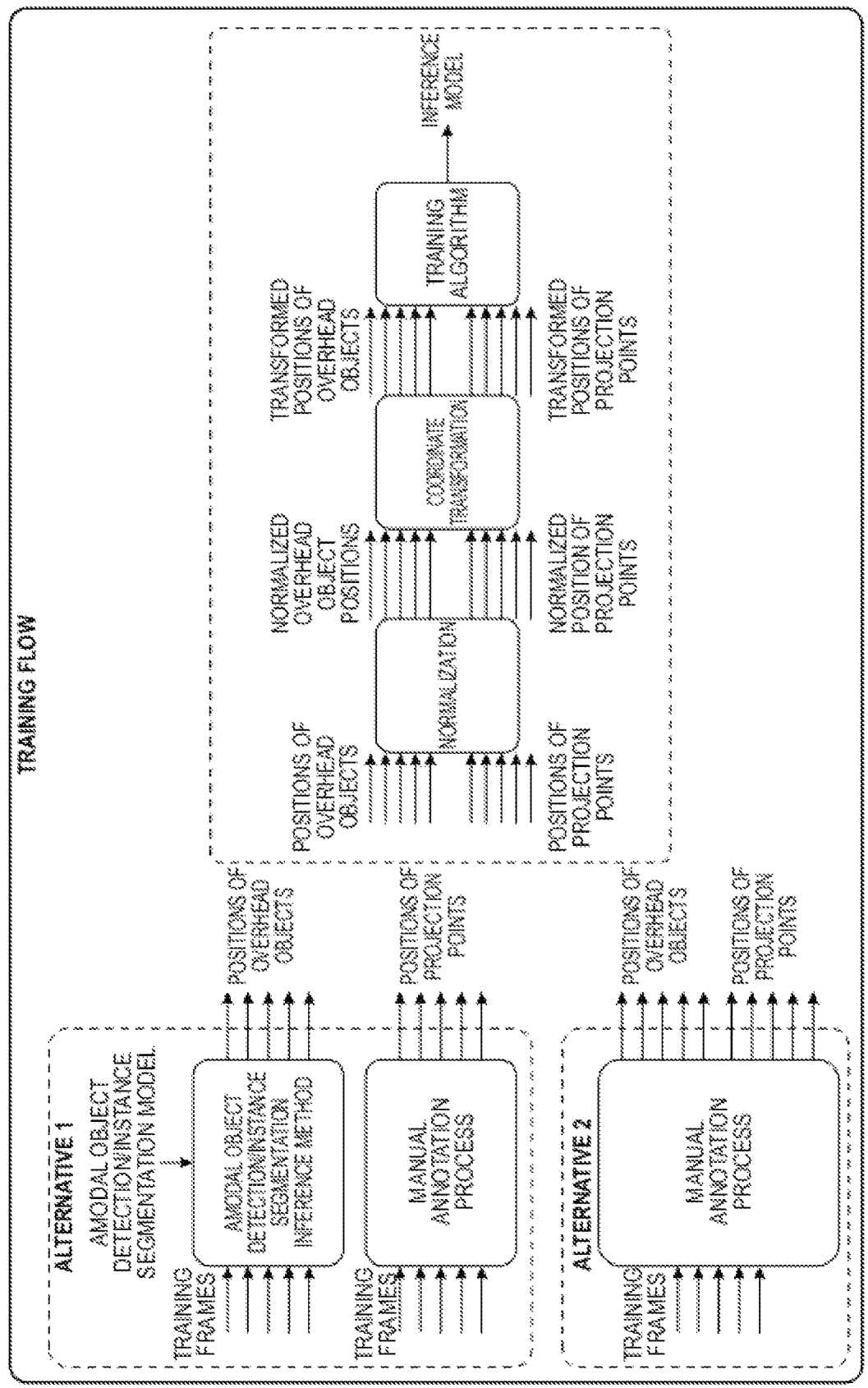
FIG. 4A is a flow chart illustrating an exemplary method for training an inference model to predict projection points of overhead objects, in accordance with some embodiments.

FIG. 4A is a flow chart illustrating an exemplary method for training an inference model to predict projection points of overhead objects, in accordance with some embodiments. In the example diagram, two alternative methods for determining the training positions of overhead objects and the training positions of projection points are illustrated, Alternative 1 and Alternative 2. In both of these alternatives, the system determines the training positions of the overhead objects and the training positions of the projection points to be used in model training, as determined in step 320 of FIG. 3. The 2D training frames received in step 310 are entered as input in both alternatives.

In some embodiments, Alternative 1 is employed. In various embodiments, this may include employment of an amodal object detection and/or instance segmentation model to determine the training positions of overhead objects, as described above. In some embodiments, a manual annotation process is used to determine positions of projection points, as described above.

In some alternative embodiments, Alternative 2 is employed. In some embodiments, the training frames are entered as input into a manual annotation process, whereby the training frames are annotated manually to include the positions of the overhead objects as well as the positions of the projection points of the overhead objects. The manual annotations are then used to determine the training positions of overhead objects and the training positions of projection points.

In some embodiments, once the training positions of overhead objects and the training positions of projection points are obtained, they are entered as input into a normalization process. During this normalization process, the pixel coordinates of the training positions are normalized to fit the data into [0, 1] space, i.e., a range between 0 and 1. To obtain normalized coordinate data, in some embodiments, the system performs a division operation. The system divides width related data points (e.g., width of the overhead object, top-left pixel location of the overhead object in y-axis) by the training image width and height related data points (e.g., height of the overhead object, top-left pixel location of the overhead object in y-axis) by the training image height to calculate floating point numbers. This can enable the AI models to obtain better accuracies.

In some embodiments, coordinate transformation is then applied to the normalized overhead object positions and the normalized positions of projection points. In some embodiments, bounding boxes are generated for each of the objects based on the training positions of the objects. In some embodiments, the coordinate transformation process then converts the representation of the bounding boxes from the common format of (top-left x-axis, top-left y-axis, bottom-right x-axis, bottom-right y-axis) to the format of (bottom-center x-axis, bottom-center y-axis, width, height). Since overhead object images are typically collected with cameras that have low roll angles in general, points that are considered to be most directly related to the projection point, the bottom center points of the bounding box, are selected as inputs along with the width and height of the bounding boxes. In some embodiments, therefore, the projection point of the overhead objects is represented with the relative displacement of the projection point with respect to the bottom-center point of the bounding box. Thus, the projection point represented in the normalized space is transformed to the space such that projection points are defined as relative to the bottom center of the object's bounding box. These coordinate transformations can enable the AI models to obtain better accuracies.

In some embodiments, the training algorithm is then performed to train at least one inference model. In some embodiments, the system has obtained bounding box notations as bottom-center coordinate points with two variables (i.e., x and y coordinates) and width and height coordinates. Depending on these four degrees of freedom, the system obtains the projection point of each object, represented with relative x and relative y distance, which represents two degrees of freedom. Thus, based on an input of a four-dimensional vector, the system obtains an output of a two-dimensional vector. The AI models will be trained with these inputs and target outputs. In some embodiments, the system converges the least error points to the estimated projection point and the actual point. The training operation involves the system attempting to converge the least number of error points to the estimated projection point and the actual projection point.

In some embodiments, training the one or more AI models includes calculating one or more regression loss functions. In various embodiments, the regression loss function may be one of: a mean squared error (MSE) function, a mean absolute error (MAE) function, and a mean high-order error loss (MHOE) function. In various embodiments, the regression loss function may be one or of: a Huber Loss, a log-cosh loss, and a quantile loss. In some embodiments, the loss function may be a classification loss function. In some embodiments, the classification loss function may be one of, e.g., cross entropy loss, focal loss, and hinge loss.

In some embodiments, in order to train an AI model, the system may alternatively utilize MSE loss and MHOE loss functions. In some embodiments, for the MHOE loss function, the system uses $4^{th}$ power of the error. The effect of these losses on the solution's performance is then examined. In some embodiments, since MSE loss works reliably for most regression problems for the default option, the system employs MSE loss. However, in some embodiments, MHOE is also employed to minimize maximal errors.

In some embodiments, the training of the AI models is performed at least in part using one or more datasets generated via a simulation, the simulation comprising a model of the overhead object. In some embodiments, simulation tools may be used to produce a potentially large amount of simulated data. In some embodiments, the simulation further includes a model of each of the one or more cameras and one or more lens characteristics pertaining to the one or more cameras. These models are used to design and implement simulation tools. In some embodiments, random rotations for the overhead objects are also considered in the tool for completeness of this proposed study. In some embodiments, a number of distortions or disturbances may be added to both the vector of the input and the vector of the output during training in order to reproduce realistic object detection operations.

In some embodiments, for modeling a simulation camera, a pinhole camera model may be generated. In some embodiments, this pinhole camera model may be generated by including the assumption that image coordinates are Euclidean coordinates having equal scales in both x and y directions. In some embodiments, in order to map a point, X, defined in the world coordinate system to the image plane and then represent the point, x, in the pixel coordinate system, a series of projection operations are applied. It may be further assumed that the image plane is placed on the principal axis where $Z_c$=f (focal length) and the principal point $p_c$ is the exact center of the image plane. The center points of the camera coordinate system and world coordinate system may then be denoted by C and W, respectively.

In some embodiments, mapping from the 3D world point to 2D pixel space can be conducted via matrix multiplication with the camera projection matrix. The projection matrix can be represented as:

x=PX

In some embodiments, the compact representation of the projection matrix is formed by the multiplication of intrinsic and extrinsic matrices. The intrinsic matrix, often called the camera calibration matrix, is a transformation matrix that maps points from the camera coordinate system to the pixel coordinate system. The extrinsic matrix is also a transformation matrix from the world to the camera coordinate system. While the orientation and position information of the camera is stored in the extrinsic matrix, internal camera and lens properties like focal length, principal point, and pixel pitch may be represented by the intrinsic one. The intrinsic matrix, K, can be defined in homogeneous coordinates space:

$$K = \begin{bmatrix} f & 0 & p_{c,x} \\ 0 & f & p_{c,y} \\ 0 & 0 & 1 \end{bmatrix}$$

where the coordinates of the principal point are $(p_{c,x}, p_{c,y})^T$, and f symbolizes the focal length. The extrinsic matrix maps points from the world coordinate system to the camera coordinate system via rotation and translation operations. In some embodiments, to form the rotation component, R, of the extrinsic matrix, Euler angles around each axis are defined.

In some embodiments, the rotation angles around the x, y, and z axes in the given direction are defined as Pitch, Yaw, and Roll angles, and the corresponding rotations are denoted as Rx( ) Ry( ) and $R_z$( ) in 3×3 matrix form. In some embodiments, a sequence of multiplication operations is performed using all three rotation matrices to form the rotation matrix. The order of the multiplication affects the resulting rotation matrix because the matrix multiplication does not commute. In some embodiments, the system executing the simulation rotates the camera first about the z-axis, then the y-axis, and then the x-axis.

In some embodiments, back-projection operations are used to find the 3D world coordinate of a pixel. In some embodiments, since the back-projection operation of a pixel point turns to a ray passing through the camera center and the pixel point, the ray needs to be tracked until the ray intersects with a solid and opaque 3D point in the world coordinate system.

In some embodiments, radial distortion is taken into account during the simulation. Lens distortions may introduce a certain amount of non-linearity to the imaging system. Depending on the physical properties of the utilized lenses for cameras, different distortion effects may be seen in the visuals taken from the camera. In some embodiments, since distortions deflect the location of the mapped point on the image, the system models the distortions for accurate mapping operations either from 2D to 3D or vice versa. These distortions are taken into consideration by the system while mapping a 3D world coordinate point to a pixel plane.

In some embodiments, the system achieves the simulated dataset by first mapping a 3D overhead object to 2D pixel coordinates and then defining the bounding box covering the object. In some embodiments, the 3D object is modeled as the initial step. In some embodiments, the system defines an arbitrary reference point as the origin of the world coordinate system, and a rectangular prism whose dimensions are (w, h, l) is placed at another arbitrary point $(X_o, Y_o, Z_o)^T$. The system models the 3D overhead object such that it can rotate around the Y-axis within defined rotation angle limits. In some embodiments, a fixed and flat elevation model is used to define the projection surface in the designed simulation tool. In some embodiments, in the next step, the camera center is placed in an arbitrary position $(X_c, Y_c, Z_c)^T$, and the rotation angles (i.e., roll, pitch, yaw) are set. In some embodiments, the principal point is selected as the exact center of the camera plane for the simulation operations. In some embodiments, the 2D undistorted pixel position corresponding to any 3D point is determined in the simulated environment by mapping the 3D points with the projection matrix. Then, according to the decided distortion model and selected parameters of it, the distorted location of each point is calculated.

In some embodiments, the simulated object and the projection point are printed on the simulation image after determining one or more of the camera parameters, lens parameters, 3D placements, and rotations of both the object and the simulated camera. In some embodiments, a bounding box is then placed on the simulated object image to simulate the amodal object detection or instance segmentation results. In some embodiments, the system adds random deviations to simulate defects such as, e.g., alignment or boundary estimation issues resulting from amodal detection.

In some embodiments, one or more AI models may employ a deep detection method working with regression principles to detect the projection points of the overhead object's center. In some embodiments, in the training stage, inputs indicating the locations of the overhead objects in the image are fed to the network, and the relative locations of the projection points with respect to the object are predicted. Then these predictions are validated with given ground truth locations, and the calculated loss using the prediction and actual projection locations is fed back to the network. In some embodiments, in the inference stage, the relative position of the projection point is estimated by utilizing the object's location in the image.

In some embodiments, training the model involves feeding back one or more specified faulty predicted positions of projection points of the overhead objects to the one or more AI models to refine future output of the AI models. In some embodiments, training the model involves obtaining an optimally performing AI model state by determining a state minimizing the specified faulty predicted positions.

In some embodiments, the trained inference model is configured to use one or both of: convolution layers, and dense layers. In some embodiments, the trained inference model is configured to use one or more nonlinear activation functions.

Figure 5:
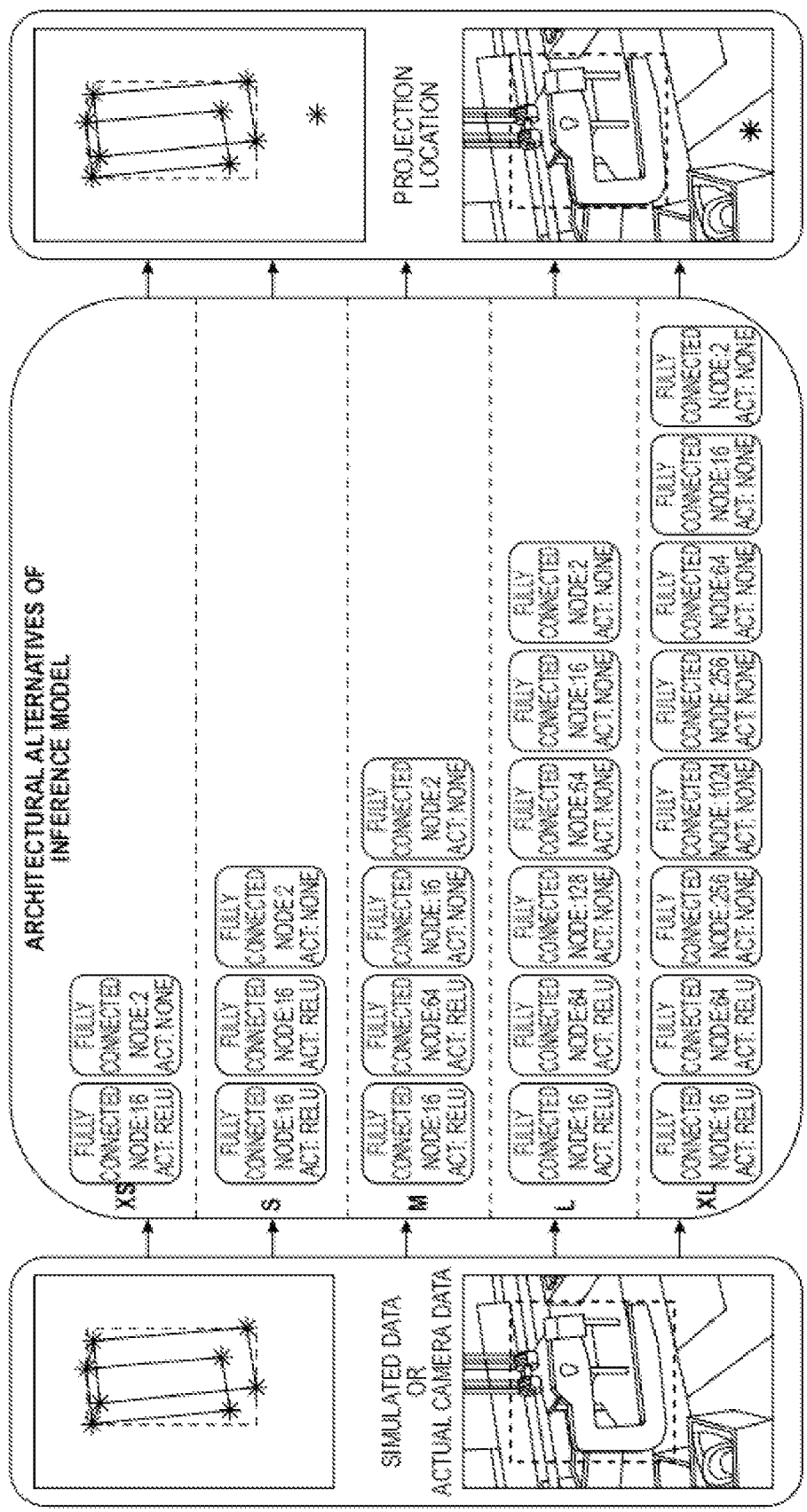
FIG. 5 is a diagram illustrating one example embodiment of a model architecture for predicting the projection points of overheard objects, in accordance with some embodiments.

In some embodiments, to indicate the object's position, the system uses a bounding box-based representation. In some embodiments, multiple different versions of the AI model may be trained with varying levels of layer depths. FIG. 5 illustrates this in further detail.

FIG. 5 is a diagram illustrating one example embodiment of an architecture for predicting the projection points of overheard objects, in accordance with some embodiments. From the shallowest to the deepest, the networks of the AI inference models are named, respectively, XS, S, M, L, and XL. These may be considered to be architectural alternatives of the AI inference models. In some embodiments, ReLu activations are employed after each fully connected layer except for the output layers in all architectural alternatives.

In some embodiments, the system validates the predicted projection points of the center of the object with one or more actual projection points; and then feeds back the calculated regression loss to the one or more AI models to refine future output of the AI models. This is to be performed during the training stage with respect to step 330.

Returning to FIG. 3, at step 340, the system receives one or more 2D inference images of the overhead objects captured by one or more cameras within the environment.

The 2D inference images must be used during this inference part of the operations, rather than the 2D training frames which were used during the training part of the operations. In various embodiments, training frames may be captured across different times, different situations, and in different lighting conditions. Some of the training frames may, e.g., have darker regions than others, or may capture different areas than others. In some embodiments, part of the goal of the training phase is the collection of a large set of samples to cover a myriad of different possibilities, situations, and conditions, because increasing diversity in training images can lead to improved training results. In contrast, the 2D inference images are representative of the facility or environment using the cameras as desired or as necessary to carry out its needed operations, i.e., in a "real world" context. Further, in some embodiments, while the 2D training frames may be manually annotated in some embodiments, it's often infeasible to annotate the 2D inference images manually, as some or all of the operations being carried out are automated in nature. As another consideration, in some embodiments, during the training phase, the system obtains the positions of overhead objects and projection points, whereas during the inference phase, the positions of people within the environment may also need to be ascertained, as will be discussed below with respect to later steps of the method.

At step 350, the system processes the 2D inference images to determine one or more inferred positions of the overhead objects. In some embodiments, predicting the projection points of the overhead object is performed in real time while the overhead object is in motion. In some embodiments, the system estimates the projection point of the object based on one or more of the camera angle, yaw, pitch, and roll and camera center. In some embodiments, the system detects one or more changes in one or more of the camera angle, yaw, pitch, roll, and camera center, and retrains the inference model based on those changes.

Figure 4B:
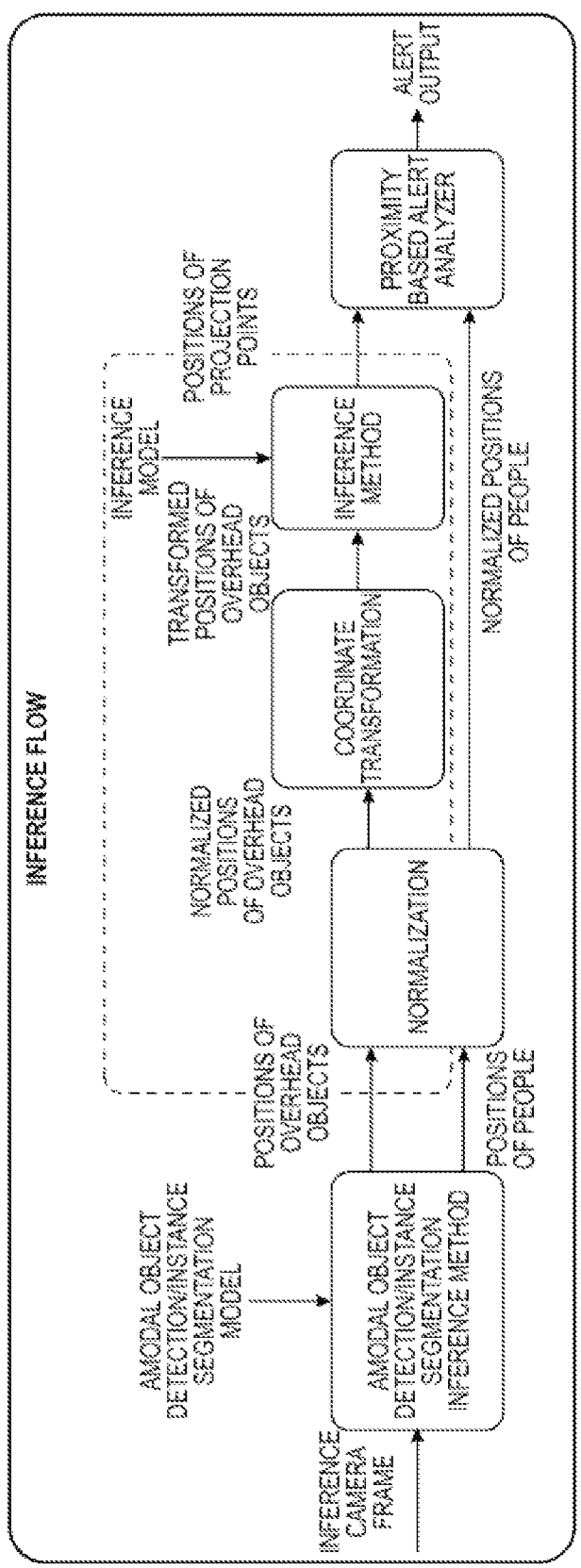
FIG. 4B is a flow chart illustrating an exemplary method for a trained inference model to infer and predict positions and projection points of objects in the environment, in accordance with some embodiments.

An example of an inference flow for inferring the positions of the overhead objects and other inference data, according to some embodiments of the invention, is illustrated in FIG. 4B.

FIG. 4B is a flow chart illustrating an exemplary method for a trained inference model to infer and predict positions and projection points of objects in the environment, in accordance with some embodiments.

First, one or more 2D inference images (i.e., frames from camera output) are received, as described above with respect to step 340. As an inference camera frame is received, an amodal object detection or instance segmentation method is performed on the inference camera frame. As a result of this method, the positions of one or more overhead objects and positions of one or more people have become visible or apparent within the frame.

In some embodiments, normalization is then applied to the positions of the overhead objects and the positions of the people. The normalization process is similar or identical to the process described above with respect to normalization during the training process in FIG. 4A.

In some embodiments, coordination transformation is then applied only to the overhead object positions, which may be normalized in some embodiments. As a result of this coordinate transformation, the system outputs a transformed position of these overheard object positions. The coordinate transformation process is similar or identical to the process described above with respect to coordinate transformation during the training process in FIG. 4A.

Next, the system employs the inference model that was trained during the training phase (i.e., step 330 of FIG. 3) to infer, via a trained inference method, the positions of projection points of the overhead objects. In some embodiments, a two-dimensional vector will be inferred for each overhead object, representing x and y coordinates as well as width and height coordinates. For example, if there are three cranes within the environment, then the system will obtain three transformed position vectors, and use them as input to the trained inference model to infer and predict the positions of projection points for those three cranes as three two-dimensional vectors as the output for the model.

Returning to FIG. 3, at step 360, the system predicts 2D inferred positions of the projection points of the overhead objects, as described above with respect to the trained inference model performing the inference method in FIG. 4B.

At step 370, the system provides, to one or more client devices, the predicted 2D inferred positions of the projection points of the overhead objects. In some embodiments, the client devices may be associated with one or more users of the system. For example, administrators or managers of a workplace environment containing overhead objects may be associated with client devices which are provided with the predicted projection points of the overhead objects. In some embodiments, the client devices may receive such data without such administrators or managers being provided or presented with the data on the display. Rather, they may be provided with one or more alerts as in optional step 380.

In some embodiments, providing the predicted 2D inferred positions of the projection points of the overhead objects is performed even when one or more of the overhead objects are rotating around their vertical axes passing through the centers of the overhead objects and their projection points.

At optional step 380, the system alerts one or more person(s) in a specified proximity to the predicted projection points of the overhead object to warn the person(s) of danger. In some embodiments, positions of the people in the environment, which in some embodiments may be normalized, are used as inputs to a proximity based alert analyzer. The inferred positions of the projection points of the overhead objects are also used as inputs to the proximity based alert analyzer. This proximity based alert analyzer determines whether there is a close proximity between the people within the environment and the overhead objects within the environment. For example, the analyzer may determine that there is a close proximity between the locations of one or more people and one or more overhead objects based on given distance threshold limit. In some embodiments, this proximity analysis is based on the positions of the feet projection points of the people, rather than, e.g., the hand projection points of the people, because the marking of the projection points of the overhead objects are at ground level, and the feet of the people are also at ground level. In some embodiments, the proximity based alert analyzer measures the distance between each projection point of each overhead object and each projection point of each person in the area.

In some embodiments, if any person is determined by the analyzer to be in close proximity to at least one projection point of any overhead object, then an alert output is generated from the analyzer. In various embodiments, the alert output may involve a notification to one or more devices associated with the people in close proximity, their manager (s), one or more administrators, supervisors, forepersons, and/or some other managing individual(s) within the environment. In some embodiments, the generated alert output is configured to warn and inform in real-time that the individual is in close proximity to at least one overhead object, and that there is a present danger associated with this close proximity.

In some embodiments, this alert may be embodied as a notification or alert presented on one or more of the client devices, e.g., an administrator or manager within the environment may be notified of the danger. In some embodiments, the system first detects the presence of at least one person within a specified proximity of the predicted projection points of the center of the object. In response to the detection, the system then provides an alert to the at least one person warning of danger. In some embodiments, the specified proximity is the distance between the predicted projection points and a detected location of the at least one person.

In some embodiments, the system predicts one or more additional projection points of one or more additional objects in the 3D coordinate space. Thus, multiple overhead objects may be present within a particular environment, and their projection points may all be predicted within that environment using the present systems and methods.

Figure 6:
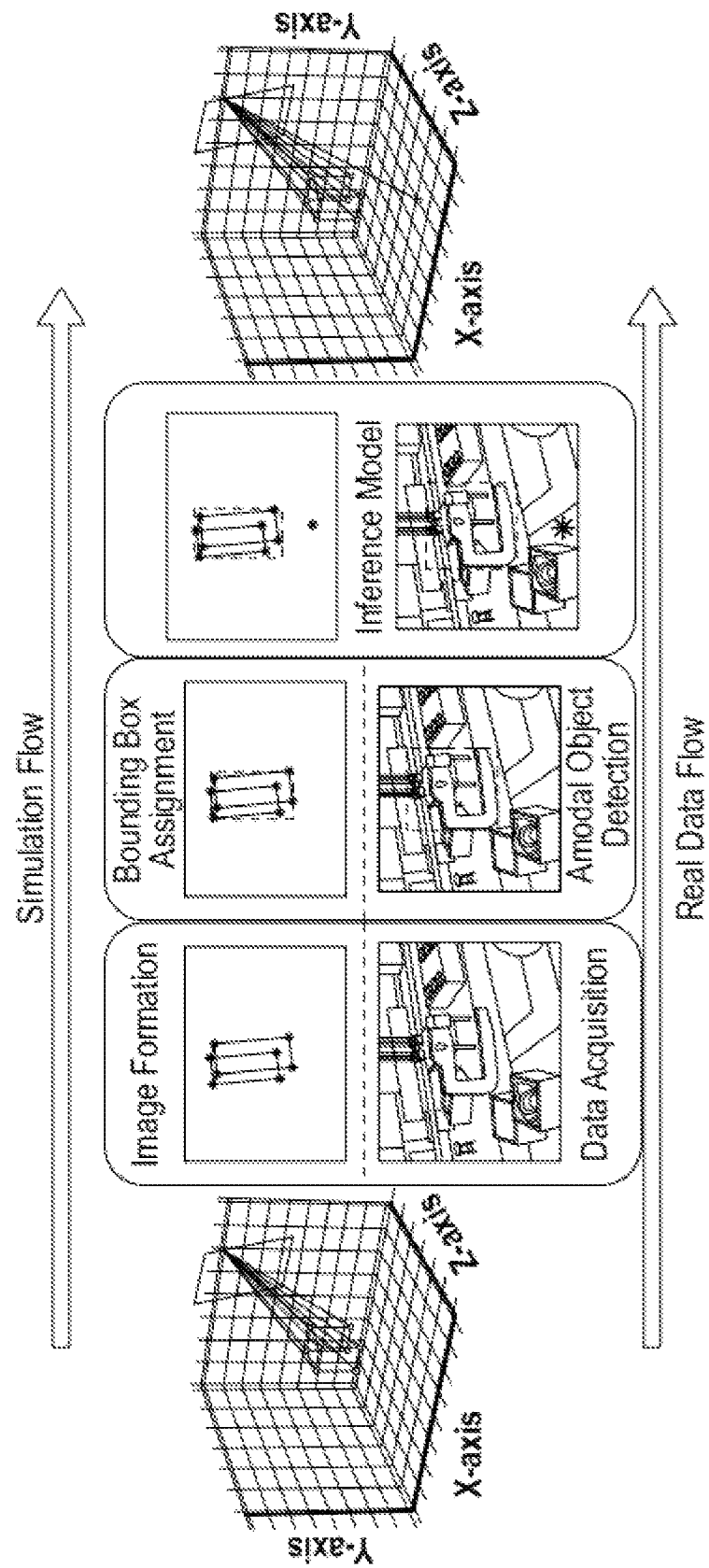
FIG. 6 is a diagram illustrating one example embodiment of a method for predicting the projection points of overheard objects, in accordance with some embodiments.

FIG. 6 is a diagram illustrating one example embodiment of a method for predicting the projection points of overhead objects, in accordance with some embodiments. In the illustrated example, a proposed solution workflow is presented for both real data and simulation data. In the simulation flow, in order to generate a simulated dataset of 2D images featuring at least one overhead object in each, the simulation operations are employed. These operations include modeling of the camera, including its camera center and angle, among other properties. In the simulation flow, the image is formed, a bounding box is assigned to indicate overhead object, and a projection point of a center of the overhead object is calculated. In the real data flow, data acquisition is performed, i.e., one or more real-world images are captured. Amodal object detection and/or a segmentation method is performed on these images to identify the overhead object in the images, with the bounding box being placed on top of the overhead object. The projection points of the center of the overheard object are predicted by using the coordinate information of the overhead object in the 2D pixel space.

Figure 7A:
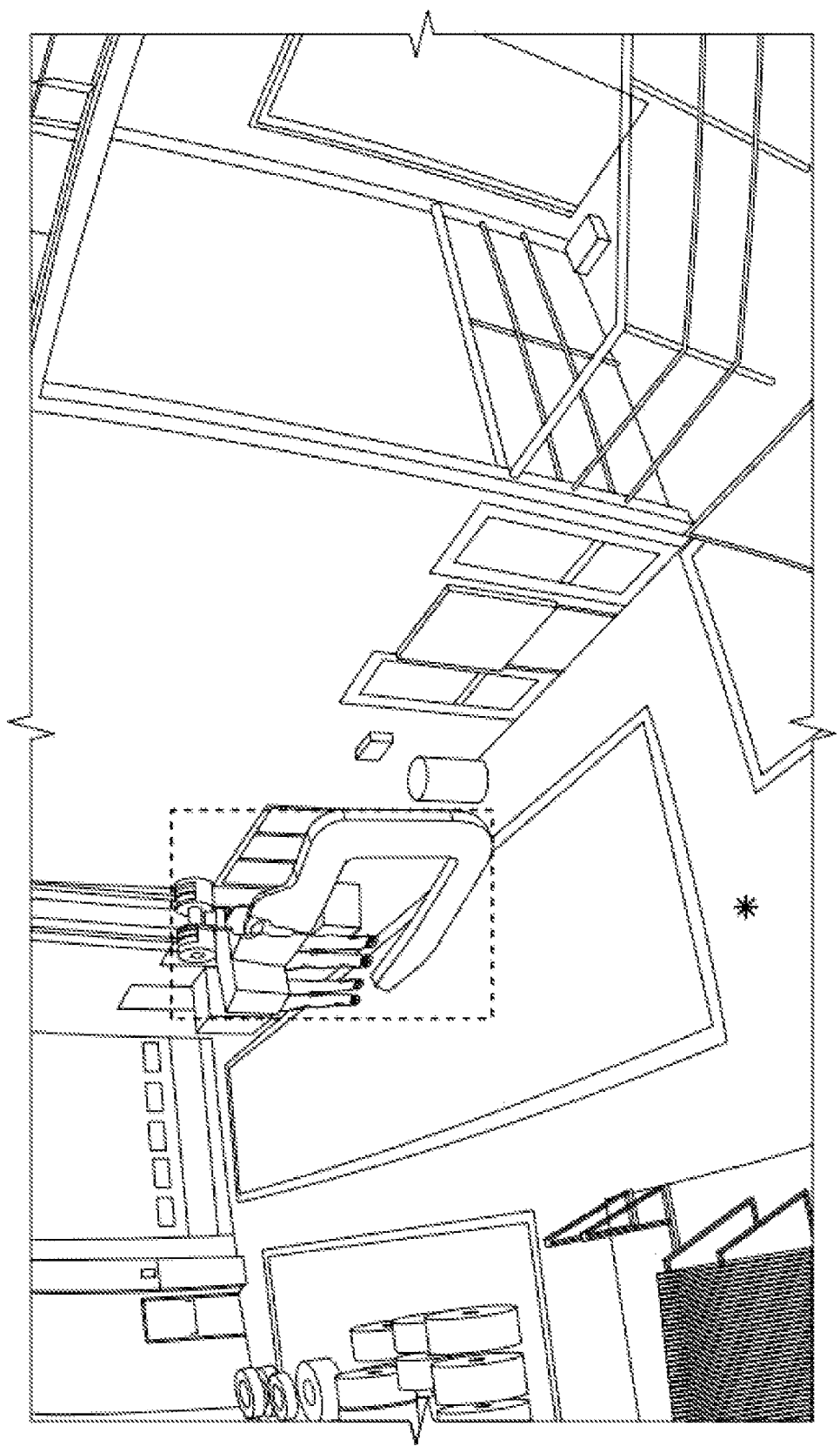
FIG. 7A is a diagram illustrating one example embodiment of a sample actual image or frame used in the prediction of projection points for overheard objects, in accordance with some embodiments.

FIG. 7A is a diagram illustrating one example embodiment of a sample actual image or frame used in the prediction of projection points for overheard objects, in accordance with some embodiments. In the diagram, a sample frame from a real-world image is shown. As a result of the systems and methods described above, the system generates a bounding box around the overheard object detected in the frame. Then the projection point of the center of the overheard object is detected and the detection point is marked in the image.

Figure 7B:
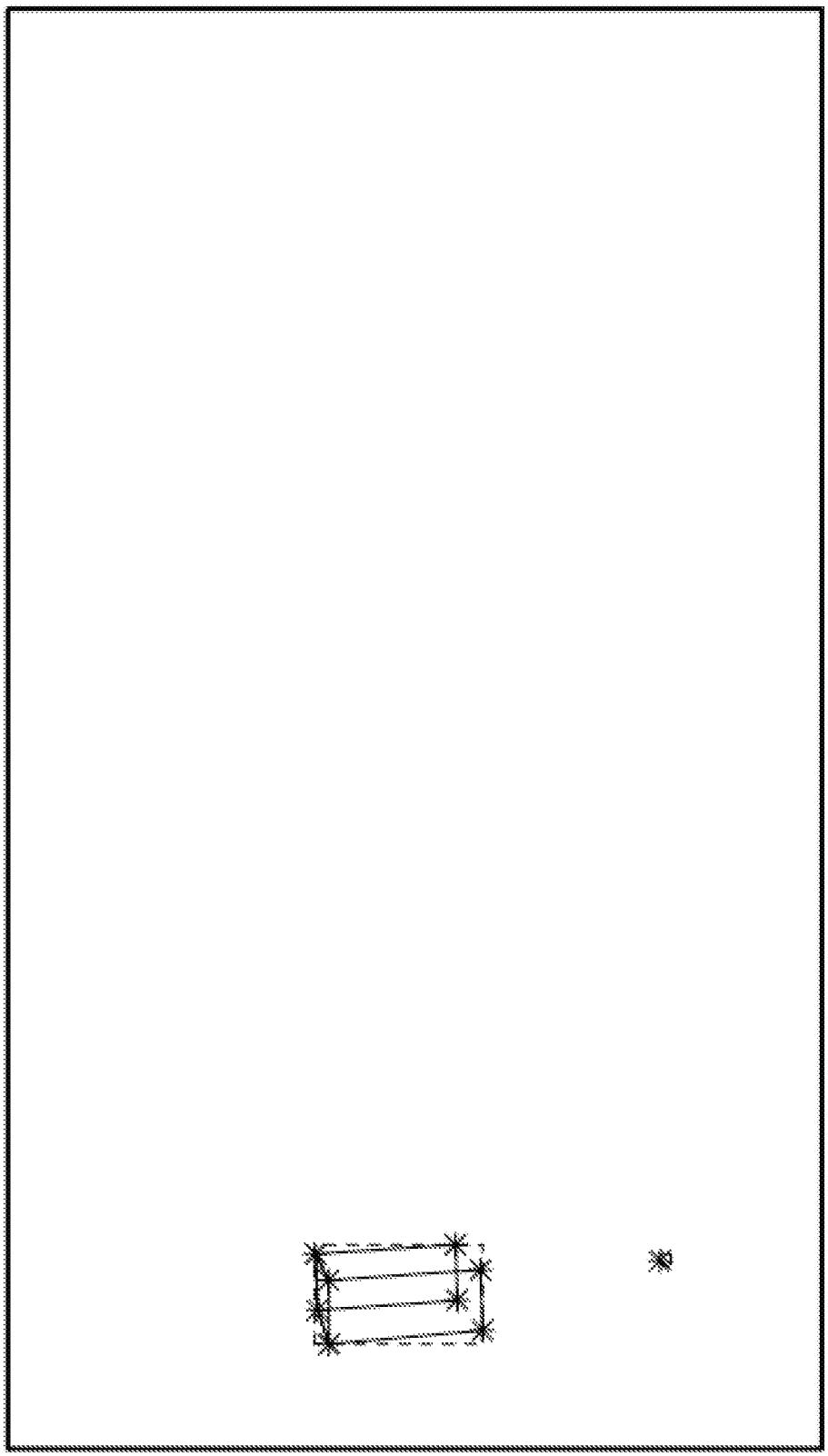
FIG. 7B is a diagram illustrating one example embodiment of a sample simulation image or frame used in the prediction of projection points for overheard objects, in accordance with some embodiments.

FIG. 7B is a diagram illustrating one example embodiment of a sample simulation image or frame used in the prediction of projection points for overhead objects, in accordance with some embodiments. In this diagram, the output for simulation data is shown. This is in contrast to FIG. 7A, where the output for real world data is shown. As a result of the systems and methods described above, the system generates a bounding box around a simulated overhead object. The projection point of the center of the simulated overhead object is then detected and the detection point is marked on the image.

Figure 8:
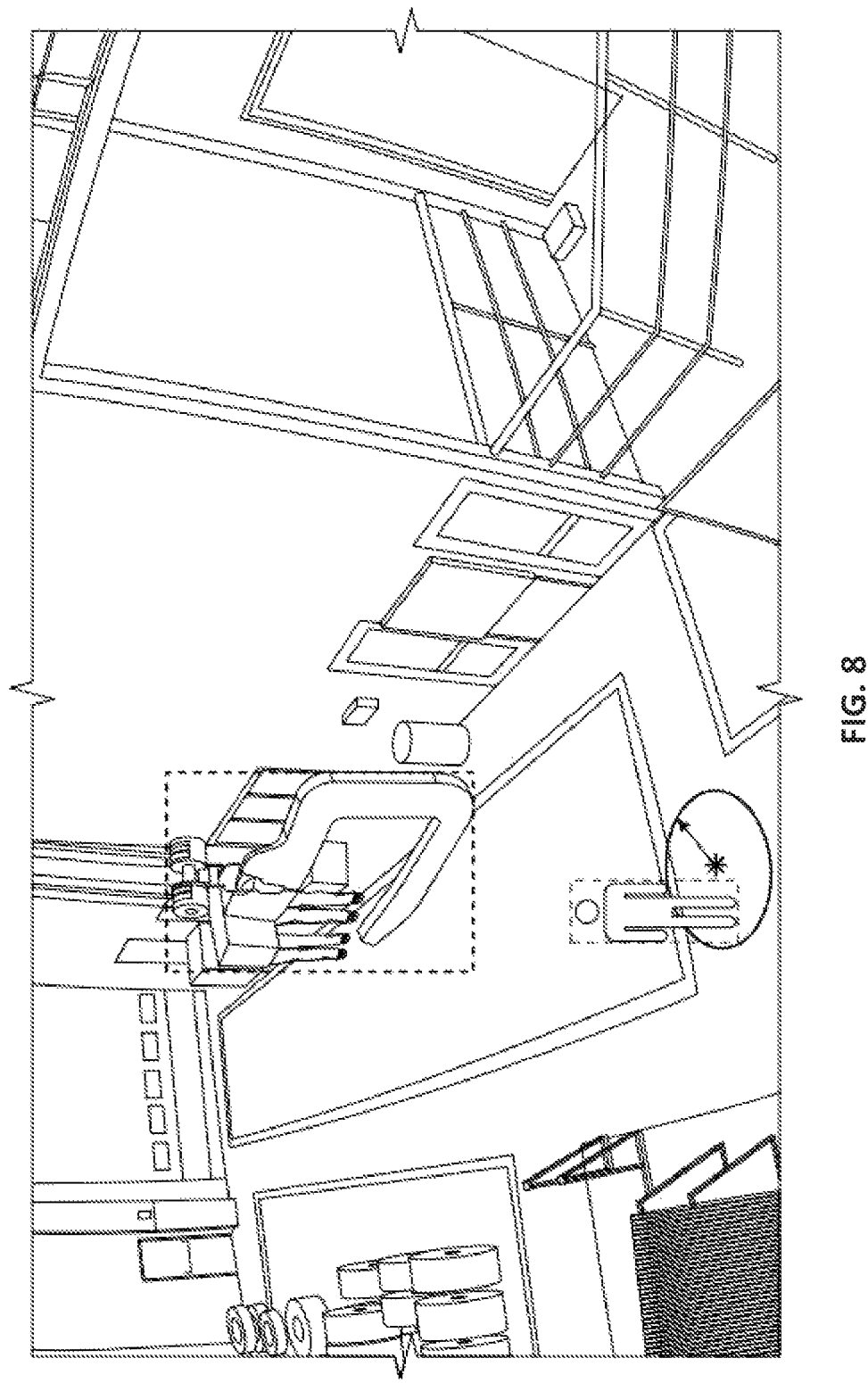
FIG. 8 is a diagram illustrating one example embodiment of a proximity based alert being triggered within an environment, in accordance with some embodiments.

FIG. 8 is a diagram illustrating one example embodiment of a proximity based alert being triggered within an environment, in accordance with some embodiments. As with the diagram in FIG. 7A, a sample frame from a real-world image is shown. As a result of the systems and methods described above, the system generates a bounding box around the overheard object detected in the frame. Then the projection point of the center of the overheard object is detected and the detection point is marked in the image. In addition to these aspects of the diagram in FIG. 7A, a figure of an individual is shown within close proximity to the projection point of the overhead object as marked. In this example, the position of a detected person within the environment is determined. The system generates a bounding box around the person detected in the frame, and then the position information of the person is normalized. The normalized position of the person in the environment is then used as input to a proximity based alert analyzer. The inferred position of the projection point of the overhead object is also used as input to the proximity based alert analyzer. The proximity based alert analyzer determines whether there is a close proximity between the person within the environment and the projection of overhead object within the environment. In this example, the proximity analysis is based on the positions of the feet projection points of the person, because the marking of the projection points of the overhead objects are at ground level.

Once the person is determined by the analyzer to be in close proximity to the projection point of the overhead object, an alert output is generated from the analyzer. This may involve a notification to a device (e.g., a smartphone) associated with the person in close proximity, their manager, and/or some other individual within the environment. This generated alert output is configured to warn and inform in real-time that the individual is in close proximity to the overhead object, and that there is a present danger associated with this close proximity.

Figure 9:
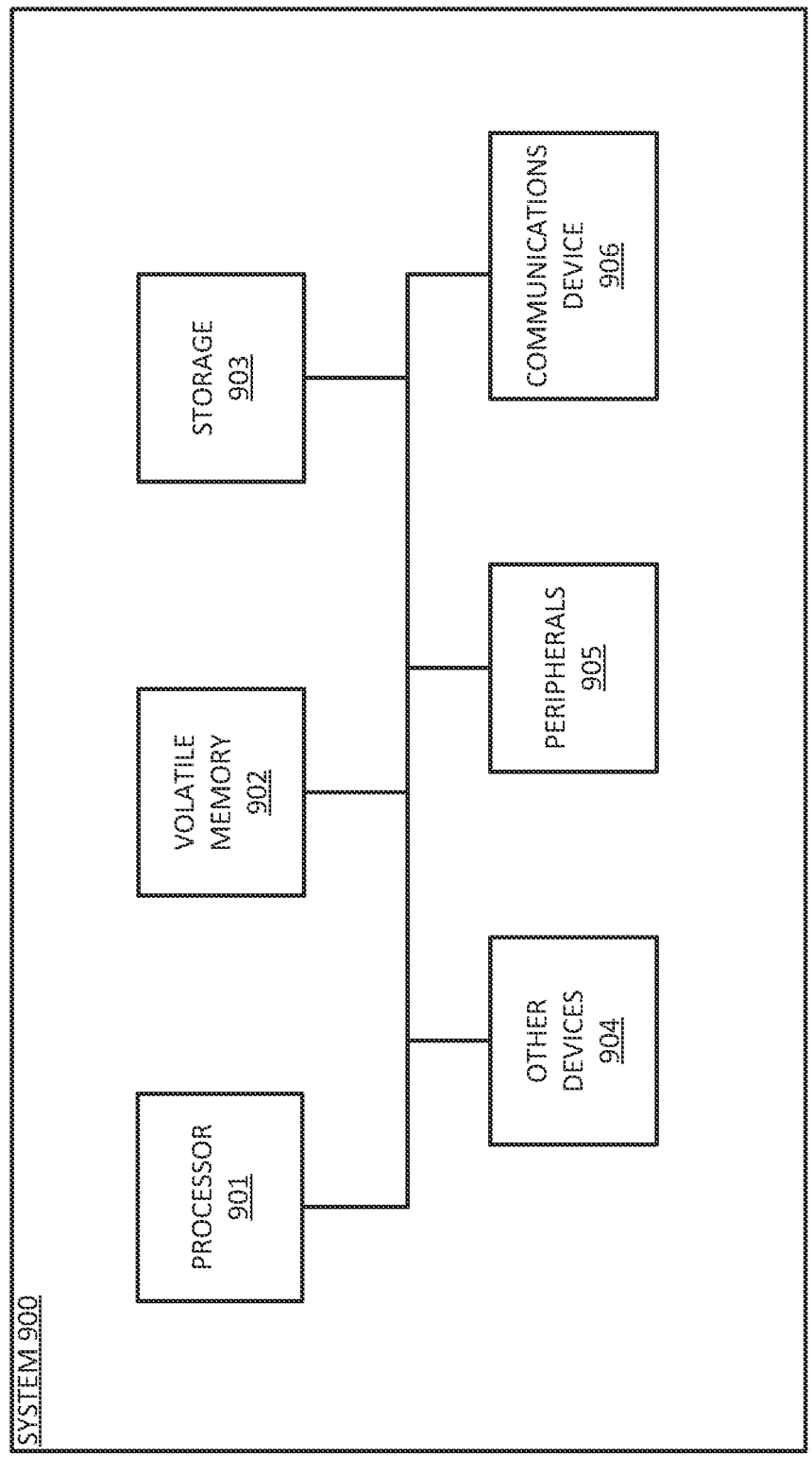
FIG. 9 is a diagram illustrating an exemplary computer that may perform processing in some embodiments.

FIG. 9 is a diagram illustrating an exemplary computer that may perform processing in some embodiments. Exemplary computer 900 may perform operations consistent with some embodiments. The architecture of computer 900 is exemplary. Computers can be implemented in a variety of other ways. A wide variety of computers can be used in accordance with the embodiments herein.

Processor 901 may perform computing functions such as running computer programs. The volatile memory 902 may provide temporary storage of data for the processor 901. RAM is one kind of volatile memory. Volatile memory typically requires power to maintain its stored information. Storage 903 provides computer storage for data, instructions, and/or arbitrary information. Non-volatile memory, which can preserve data even when not powered and including disks and flash memory, is an example of storage. Storage 903 may be organized as a file system, database, or in other ways. Data, instructions, and information may be loaded from storage 903 into volatile memory 902 for processing by the processor 901.

The computer 900 may include peripherals 905. Peripherals 905 may include input peripherals such as a keyboard, mouse, trackball, video camera, microphone, and other input devices. Peripherals 905 may also include output devices such as a display. Peripherals 905 may include removable media devices such as CD-R and DVD-R recorders/players. Communications device 906 may connect the computer 100 to an external medium. For example, communications device 906 may take the form of a network adapter that provides communications to a network. A computer 900 may also include a variety of other devices 904. The various components of the computer 900 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:
1. A method, comprising:
receiving one or more two-dimensional (2D) training images of one or more unique overhead objects within an environment;
processing the 2D training images to determine one or more training positions of each overhead object and one or more training positions of projection points of each overhead object;
based on at least the training positions of the overhead objects, training one or more artificial intelligence (AI) models to predict 2D positions of projection points of the overhead object;
receiving one or more 2D inference images of the overhead objects captured by one or more cameras within the environment;
processing the 2D inference images to determine one or more inferred positions of the overhead objects by:
identifying an overhead object in the one or more 2D inference images; and
placing a bounding box about the identified overhead object, the bounding box comprising the inferred positions;
predicting, via the one or more trained AI models and using the inferred positions of the overhead objects as input, 2D inferred positions of the projection points of the overhead objects; and providing, to one or more client devices, the predicted 2D inferred positions of the projection points of the overhead objects.

2. The method of claim 1, wherein the 2D inference images further comprise one or more people in the environment, the method further comprising:
processing the 2D inference images to determine one or more inferred positions of the people in the environment.

3. The method of claim 2, wherein processing the 2D inference images to determine the inferred positions of the people in the environment is performed via one of:
amodal object detection, or instance segmentation.

4. The method of claim 2, further comprising:
determining that an inferred position of at least one of the people in the environment is within a specified proximity of at least one of the predicted 2D inferred positions of the projection points of the overhead objects; and
in response to the determination, providing an alert to at least one of the people in the environment warning of dangerous proximity to at least one of the overhead objects.

5. The method of claim 4, wherein the determination comprises determining that the distance between at least one of the predicted 2D inferred positions of the projection points of the overhead objects and at least one of the positions of the people in the environment is lower than a threshold distance.

6. The method of claim 1, further comprising:
normalizing the inferred positions of the people in the environment to a range between 0 and 1.

7. The method of claim 1, wherein the training positions of the overhead objects, the training positions of the projection points of the overhead objects, and the inferred positions of the overhead objects are configured to be pixel coordinates.

8. The method of claim 1, wherein training the one or more AI models comprises normalizing the training positions of the overhead objects and the training positions of the projection points of the overhead objects to a range between 0 and 1.

9. The method of claim 8, wherein training the one or more AI models further comprises applying coordinate transformation to the normalized training positions of the overhead objects and the normalized training positions of the projection points of the overhead objects, and wherein applying coordinate transformation comprises defining the normalized training positions of the overhead objects and the normalized training positions of the projection points of the overhead objects as relative to the bottom center of the bounding box for the overhead objects.

10. The method of claim 1, wherein the processing of the 2D training images and determining of the training positions of the overhead objects is performed via one or more of: amodal object detection, instance segmentation, and manual annotation.

11. The method of claim 1, wherein the processing of the 2D inference images and determining of the inferred positions of the overhead objects is performed via one of: amodal object detection, and instance segmentation.

12. The method of claim 1, wherein predicting the 2D inferred positions of the projection points of the overhead objects comprises normalizing the inferred positions of the overhead objects to a range between 0 and 1.

13. The method of claim 12, wherein predicting the 2D inferred positions of the projection points of the overhead objects comprises applying coordinate transformation to the normalized actual positions of the overhead objects, and wherein applying coordinate transformation comprises defining the normalized inferred positions of the overhead objects as relative to the bottom center of the bounding box for the overhead objects.

14. The method of claim 1, wherein the determined training positions of the overhead objects are configured to be 4 dimensional vectors, and wherein the determined training positions of the projection points of the overhead objects are configured to be 2 dimensional vectors.

15. The method of claim 1, wherein predicting the 2D inferred positions of the projection points of the overhead objects comprises using the inferred positions of the overhead objects as input to the one or more trained AI models, wherein the inferred positions of the overhead objects are configured to be 4 dimensional vectors, and wherein the predicted 2D inferred positions of the projection points of the overhead objects are configured to be 2 dimensional vectors.

16. The method of claim 1, wherein predicting the 2D inferred positions of the projection points of the overhead objects comprises converting a pixel representation of bounding boxes from a standard bounding box format to a format comprising a bottom-center x-axis, a bottom-center y-axis, a width, and a height.

17. The method of claim 1, wherein training the one or more AI models comprises comparing, via a loss function, the training positions of projection points of each overhead object to one or more specified actual positions of projection points of each overhead object.

18. The method of claim 17, wherein the loss function is a regression loss function comprising one of: a mean squared error (MSE) function, a mean absolute error (MAE) function, and a mean high-order error loss (MHOE) function.

19. The method of claim 1, wherein training the one or more AI models comprises:
feeding back one or more specified faulty predicted positions of projection points of the overhead objects to the one or more AI models to refine future output of the AI models.

20. The method of claim 1, wherein training the one or more AI models comprises:
obtaining an optimally performing AI model state by determining a state minimizing the specified faulty predicted positions.

21. The method of claim 1, wherein at least a subset of the received 2D training images is generated via a simulation, the simulation comprising at least a model of the overhead object.

22. The method of claim 21, wherein the simulation further comprises a model of each of the one or more cameras and one or more lens characteristics pertaining to the one or more cameras.

23. The method of claim 1, wherein the 2D inferred positions of the projection points of the overhead objects comprise a 2D inferred position of a center projection point of each of the overhead objects.

24. The method of claim 23, wherein the method is further configured to predict one or more additional 2D inferred positions of additional projection points of the overhead objects other than the center projection points of the overhead objects.

25. The method of claim 1, wherein each of the one or more cameras are configured to operate at any height and at any angle as long as the overhead object is within view of the camera, and wherein the ground level of the environment is visible within view of the camera.

26. The method of claim 1, further comprising:
wherein the inferred positions of the people are projection points of people in the environment;
inputting the determined position into a proximity based alert analyzer; and
determining, by the proximity based alert analyzer, based on a distance threshold limit, whether there is a close proximity between the people within the environment and the overhead objects within the environment.

27. The method of claim 26, wherein the proximity based alert analyzer measures the distance between each projection point of each overhead objects and each projection point of each person in the area.

28. The method of claim 27, wherein each projection point of each person are feet projection points of each person.

29. A method, comprising:
receiving one or more two-dimensional (2D) training images of one or more unique overhead objects within an environment;
processing the 2D training images to determine one or more training positions of each overhead object and one or more training positions of projection points of each overhead object;
based on at least the training positions of the overhead objects, training one or more artificial intelligence (AI) models to predict 2D positions of projection points of the overhead object;
receiving one or more 2D inference images of the overhead objects captured by one or more cameras within the environment;
processing the 2D inference images to determine one or more inferred positions of the overhead objects;
predicting, via the one or more trained AI models and using the inferred positions of the overhead objects as input, 2D inferred positions of the projection points of the overhead objects; and
providing, to one or more client devices, the predicted 2D inferred positions of the projection points of the overhead objects;
wherein training the one or more AI models comprises normalizing the training positions of the overhead objects and the training positions of the projection points of the overhead objects to a range between 0 and 1, and wherein training the one or more AI models further comprises applying coordinate transformation to the normalized training positions of the overhead objects and the normalized training positions of the projection points of the overhead objects, and wherein applying coordinate transformation comprises defining the normalized training positions of the overhead objects and the normalized training positions of the projection points of the overhead objects as relative to the bottom center of a bounding box for the overhead objects.

30. A method, comprising:
receiving one or more two-dimensional (2D) training images of one or more unique overhead objects within an environment;
processing the 2D training images to determine one or more training positions of each overhead object and one or more training positions of projection points of each overhead object;
based on at least the training positions of the overhead objects, training one or more artificial intelligence (AI) models to predict 2D positions of projection points of the overhead object;
receiving one or more 2D inference images of the overhead objects captured by one or more cameras within the environment;
processing the 2D inference images to determine one or more inferred positions of the overhead objects;
predicting, via the one or more trained AI models and using the inferred positions of the overhead objects as input, 2D inferred positions of the projection points of the overhead objects; and
providing, to one or more client devices, the predicted 2D inferred positions of the projection points of the overhead objects;
wherein predicting the 2D inferred positions of the projection points of the overhead objects comprises normalizing the inferred positions of the overhead objects to a range between 0 and 1, and wherein predicting the 2D inferred positions of the projection points of the overhead objects comprises applying coordinate transformation to the normalized actual positions of the overhead objects, and wherein applying coordinate transformation comprises defining the normalized inferred positions of the overhead objects as relative to the bottom center of a bounding box for the overhead objects.

* * * * *